Figure 1:
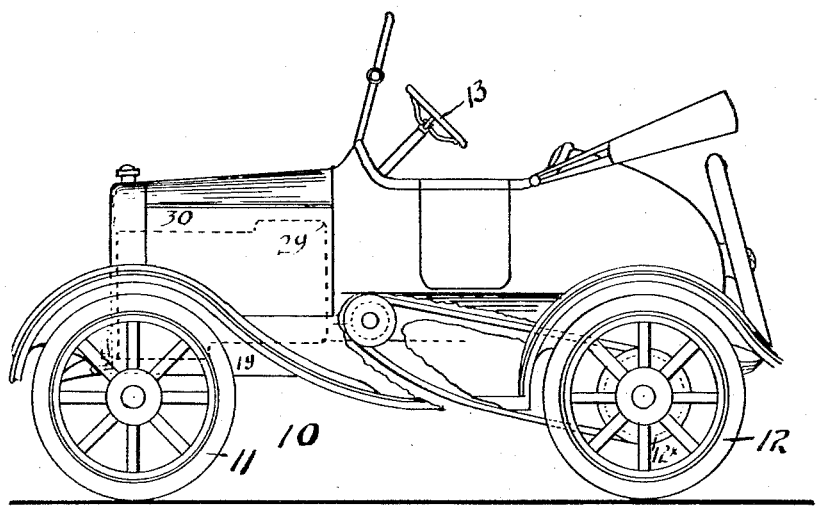

B. C. GRAY.
SPRING MOTOR VEHICLE.
APPLICATION FILED DEC. 16, 1919.

1,381,870.

Patented June 14, 1921.
3 SHEETS—SHEET 1.

INVENTOR
Berte C. Gray.
BY
William C. Edwards Jr.
ATTORNEY

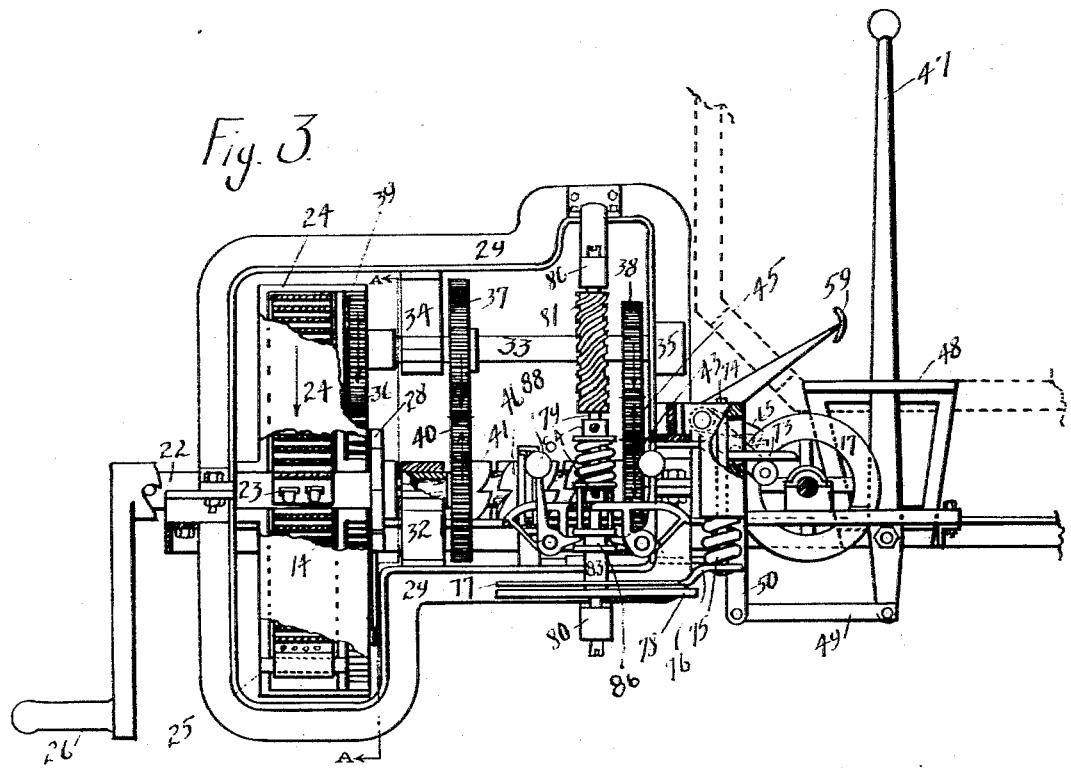
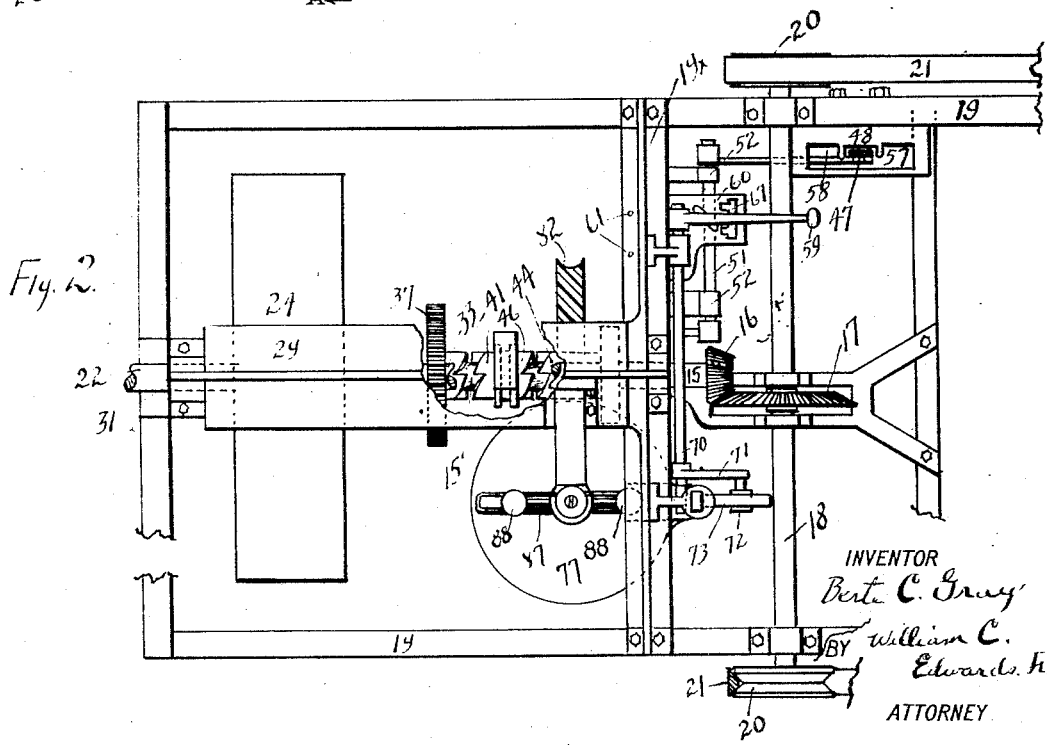

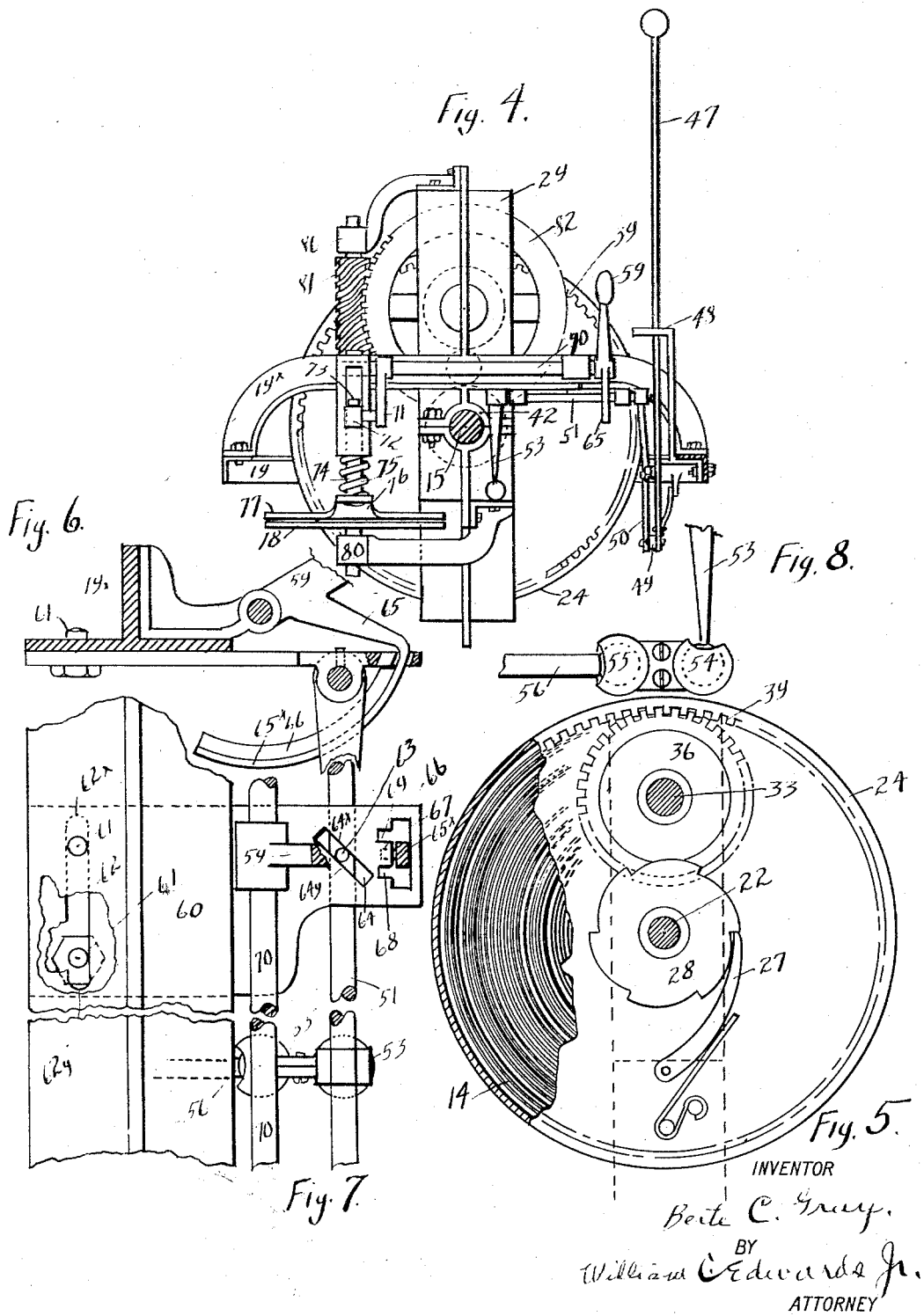

UNITED STATES PATENT OFFICE.

BERTE C. GRAY, OF SEDGWICK, KANSAS.

SPRING-MOTOR VEHICLE.

1,381,870.   Specification of Letters Patent.   Patented June 14, 1921.

Application filed December 16, 1919. Serial No. 345,340.

*To all whom it may concern:*

Be it known that I, BERTE C. GRAY, a citizen of the United States, residing at Sedgwick, in the county of Sedgwick and State of Kansas, have invented certain new and useful Improvements in Spring-Motor Vehicles, of which the following is a description, referring to the drawings which accompany this specification.

The vehicle embodied in my invention is intended to be used and operated by children, preferably as a small automobile adapted to be self-propelling for short distances, through power generated by spring operation. The child first cranks up the spring as a motor, then gets into the car in the customary manner and by means and mechanism later described drives the car as desired or within the radius of its power limitations.

In the drawings, Figure 1 a side elevation of a child's automobile within which the elements disclosed in the further figures of the drawings are to be considered installed and ready for operation. Fig. 2 is a top view of a portion of the chassis of the automobile seen in Fig. 1 and disclosing clutch and driving mechanism of the invention. Fig. 3 is a side view of the spring motor, clutch and driving mechanism as installed within the automobile. Fig. 4 is a rear view of the elements seen in Fig. 3. Fig. 5 is a view taken along the line A—A Fig. 3 and looking in the direction of the arrows and shows the spring motor mechanism and allied parts. Figs. 6 and 7 show detail views of the foot pedal and allied mechanism. Fig. 8 shows a ball and socket joint on the line controlled by the shifting gear mechanism. Similar numerals of reference indicate corresponding parts throughout the drawings.

Referring to the drawings, the toy automobile 10 Fig. 1 is provided with front wheels 11 and rear wheels 12. The steering wheel 13 connected to the wheels 11 in the customary manner permits the child to control the direction of the car during operation. The power developed by a coiled spring 14 acting as a motor serving to drive a shaft 15 and through gears 16, 17 drive a jack shaft 18 transversely arranged on the frame 19 of the car 10 and carrying two pulley wheels 20, 20. V-shaped belting 21 preferably is used in combination with each wheel 20 to transmit the power to a drum $12^x$ integral with the rear driving wheel 12. This belt 21 is left slack to allow for turning movements of the car there being no differential. The inner end of the spring 14 is attached to the shaft 22 at 23 within a barrel case 24 to which its outer end is pinned at 25. The crank 26 enables the child to turn the shaft 22 and wind up the spring 14 within the barrel case 24, a pawl 27 and ratchet wheel 28 coacting in the customary manner. A frame work 29 positioned under the hood 30 of the automobile 10 houses the mechanism disclosed in Fig. 3. The shaft 22 rotates as at 31 and 32 in bearings carried by the frame 29. On a jack shaft 33 in bearings 34 and 35 on the frame 29, three gears 36, 37 and 38 are attached. The gear 36 meshes with periphery teeth 39 on the barrel case 24; when the spring 14 is permitted to revolve the barrel case 24, the teeth 39 force the gear 36 to revolve thereby revolving the gears 37 and 38, all as indicated by their respective directional arrows. A gear wheel 40 provided with clutch teeth 41 is sleeved on the shaft 15, said shaft being revoluble in bearings 32 and 42. The gear 40 is meshed with the gear 37. A gear wheel 43 provided with clutch teeth 44 is sleeved on the shaft 15, the teeth 43 meshing with a pinion 45 which meshes with the gear 38. The teeth 41 and 44 are faced toward one another, between same on the shaft 15 is slidably engaged on a keyway a double faced toothed clutch 46 by means of shifting mechanism later described this clutch 46 can be slid to engage teeth 41 on gear 40 whereby the shaft 15, gears 16, 17, shaft 18, pulley wheels 20, belting 21, operate to turn the wheels 12 so as to give forward motion to the automobile 10; whereas if the sliding gear clutch 46 engage the clutch 44 on gear 43 then the spring 14 acting through the reverse gearing 38, 45, 43 will occasion rearward motion to the driving wheels 12.

In Figs. 2 and 3 the clutch 46 stands in neutral, which is also the position of the shifting lever 47 which is engaged in the neutral slot of the plate 48. Through the connecting rods 49, 50, a shaft 51, supported at 52, 52 to the frame, is operated. From shaft 51 depends the bar 53 terminating in a ball and socket joint 54, while another ball and socket joint 55 carries a connecting rod 56 connecting to the clutch 46. Moving the lever 47 to engage the slot 57 thus moves the clutch 46 to engage clutch 40 for forward motion of the car. Moving lever 47 to engage slot 58 moves clutch 46 to engage clutch 43 for reverse movement. The engagement of clutch mechanism just described however does not at once permit of automobile motion in the desired direction, this motion does not occur until the foot pedal 59 is depressed. The foot pedal 59 cannot be depressed when the lever 47 stands in neutral since a plate 60 locks the pedal 59 as will now be described. The plate 60 is slidably suspended from a cross T bar 19$^x$ on the frame 19, the bolts 61 through slot 62 in the plate 60 holding the plate 60 against the T bar 19$^x$ but permitting sliding motion in either direction within the limits 62$^x$ and 62$^y$ of the slot 62; this tendency to sliding motion is given by the movement of the lever 47 from neutral. A pin 63 on the shaft 51 projects through a diagonally situated slot 64 in the plate 60 as seen in Fig. 7. A hooked stem 65 depends from the foot pedal 59 as seen in Fig. 6, the lower portion of the stem 65 being of a T section 66. The plate 60 is slotted at 67 so that the back 65$^x$ of the stem 65 can penetrate through the plate 60, the portion 66 contacts the plate 60 when the lever 47 stands in neutral and the pin 63 stands in the central portion of the slot 64. The slot 67 is enlarged at 68 to permit of forward car motion and enlarged at 69 to permit of rearward car motion as later shown. Shifting lever 47 into slot 57 moves the pin 63 to drag against the side 64$^x$ of the slot 64 forcing the plate 60 to move sidewise so that the slot 68 registers over the portion 66 of the stem 65, then the foot pedal 59 can be depressed and the T portion of the stem pass up through the slot 67—68. Similarly moving lever 47 into reverse moves pin 63 against side 64$^y$ of the slot 64 to drag slot 69 to register with the portion 66 to permit of like movement of the pedal 59. The movement of pedal 59 turns the shaft 70 carrying a crank 71 and roller 72 to contact and raise a bar 73 integral with a vertically sliding shaft 74 against spring pressure 75. Integrally connected to the shaft 74 is an arm 76 terminating in a circular plate 77 normally held by the spring pressure 75 against a disk plate 78, the combination serving as a brake preventing car motion except when the pedal 59 operating as above described raises the plate 77 from contact with the plate 78. A vertical shaft 79 passing through plates 77 and 78 and housed in bearings 80, 80 on frame 29, carries a spiral gear 81 in mesh with helical teeth on a gear wheel 82 on the shaft 33. The disk plate 78 has a bearing 83 sliding on a keyway on the shaft 79. Between collars 84 pinned to the shaft 79 is a spring normally holding plate 78 in the position seen in Fig. 3, the spring acting against a plate from which depend pins connecting to a slotted hub 86 on the bearing 83. It is thus seen that only when the lever 47 stands in either forward or reverse may the plate 77 release pressure on the disk 78 and when they are engaged obviously the gear 81 locks the gear 82 so the shaft 33 cannot turn but when the brake plates 78 and 77 are disengaged then the shaft 15 can operate from spring power for desired motion.

But it is necessary to control the speed of the shaft 15 in order to prevent racing of the parts, this control is effected by means of rotating governors 87 which engage the slotted hub 86 and as the balls 88 of the governors are thrown outwardly the hub 86 carrying the disk 78 is raised to a brake contact again against plate 77; thus the foot pedal controls the range of speed. Such modifications may be employed as lie within the scope of the appended claim.

Having fully described my invention what I now claim as new and desire to secure by Letters Patent is:

In a self propelled vehicle, a crank, a shaft operatable thereby, a coiled spring within a barrel case arranged on said shaft, the opposite ends of said spring connecting between said spring and barrel case whereby crank rotation operates to store up energy in said spring and means for holding said tension; a jack shaft carrying gears; teeth on the periphery of said barrel case engaging one of said jack shaft gears; a driving shaft carrying gears in mesh with the other gearing on the jack shaft; clutch shifting mechanism controlling the position of clutch mechanism as arranged upon said driving shaft and adapted to selectively engage said driving shaft to said specified gearing for forward or reverse motion; gears, shafting and belting in operative combination with said driving shaft and in driving engagement with the driving wheels of the vehicle for propelling purposes; a pedal, a plate slidably operated by the clutch shifting mechanism; said plate engaging said pedal when the clutch mechanism is in neutral and preventing pedal movement but disengaging from said pedal when and after clutch engagement has been effected to permit of pedal movement; brake members comprising plates mounted on a shaft having a spiral gear portion thereon in meshed engagement with a gear on the said jack shaft, said brake plates through spring pressure being normally held in brake contact and through the spiral gear in engagement with said jack shaft gear preventing the coiled spring from releasing its stored energy; said pedal connecting to said brake members so that after and during selected clutch engagement, pedal movements operate to release the brake engagement whereby the stored energy in said coiled spring operates as specified through the functioning elements to exert desired traction upon the driving wheels of the vehicle.

BERTE C. GRAY.

Witnesses:
U. G. CHARLES,
W. A. NETHENOT.